United States Patent [19]

Spielberg et al.

[11] 3,736,648
[45] June 5, 1973

[54] METHOD OF BONDING A ZIRCONIA MEMBER WITH ANOTHER MEMBER

[75] Inventors: David Henry Spielberg; Charles J. Levesque, both of Des Plaines, Ill.

[73] Assignee: Universal Oil Products Company, Des Plaines, Ill.

[22] Filed: Dec. 20, 1971

[21] Appl. No.: 210,135

[52] U.S. Cl. ............29/473.1, 29/487, 287/189.365
[51] Int. Cl. ..............................................B23k 31/02
[58] Field of Search...........................29/473.1, 487; 287/189.365

[56] References Cited

UNITED STATES PATENTS

| | | |
|---|---|---|
| 2,163,408 | 6/1939 | Pulfrich..................287/189.365 |
| 2,512,455 | 6/1950 | Alexander...................29/473.1 |
| 2,570,248 | 10/1951 | Kelley..................287/189.365 X |
| 2,647,218 | 7/1953 | Sorg et al..................29/473.1 UX |
| 2,776,472 | 1/1957 | Mesick, Jr. ..................29/473.1 X |
| 3,110,571 | 11/1963 | Alexander...................29/473.1 X |

FOREIGN PATENTS OR APPLICATIONS 813,829  5/1959  Great Britain..................29/473.1

Primary Examiner—J. Spencer Overholser
Assistant Examiner—Ronald J. Shore
Attorney—James R. Hoatson, Jr., Ronald H. Hausch and William H. Page II

[57] ABSTRACT

Method of bonding together two members, one of which comprises zirconia. A mixture is prepared comprising an active metallic component such as titanium, zirconium, titanium hydride, or zirconium hydride, and a brazing metallic component such as silver, copper, gold, or the like. The mixture is applied to the region of the zirconia member to be bonded. The members are placed together in a contiguous relationship in the regions to be bonded. The members are then heated to above the melting point of the mixture in a non-oxidizing environment, such as in helium. After the members are bonded, they are cooled to an annealing temperature of the zirconia, and oxygen is slowly introduced into their environment. The oxygen makes up any deficiency of oxygen in the zirconia member resulting from the bonding procedure.

13 Claims, No Drawings

METHOD OF BONDING A ZIRCONIA MEMBER WITH ANOTHER MEMBER

BACKGROUND OF THE INVENTION

The present invention relates to a method of bonding together two members, one of which comprises zirconia.

Zirconia is a ceramic type of material which has found utilization in the field of solid oxygen electrolytes. When used as an electrolyte, it generally must be bonded together with an electrode made of a metallic material such as stainless steel, the various iron, nickel or copper alloys, zirconium, and the like.

The state of the art of bonding together a ceramic and a metal is quite volumous. One particular technique used for bonding together a ceramic and a metal or a ceramic and another ceramic is referred to as the "active metal" technique. Reference should be made to "A Survey of Ceramic — to — Metal Bonding" authored by G.R. VanHouten and found in volumn 38 metallic 6 (1959) of the *Ceramic Bulletin*. On page 303 of that article there is found a brief summary of the "active metal" film bonding techniques used in 1959. Basically, the techniques use titanium or zirconium or their hydrides as the bonding agent in combination with a brazing material, such as copper, silver, gold, nickel-manganese, and the like. The mixture is put into a solution or emulsion and painted onto the ceramic. The ceramic is then placed into a contiguous relationship with the members to be joined and then heated above the melting point of the mixture (400° C or more) in a protective environment. Issued U.S. Pat. on specific techniques include: Nos. 3,063,144; 2,913,077; 3,281,931; 2,838,390; 2,820,534; 2,570,248; 3,417,461; 3,517,432, and 2,724,892.

The various methods referred to in this article, as well as the patents, probably work quite well with the particular applications they are specifically directed to. However, we have discovered that a unique problem arises when attempting to bond zirconia with another member. The problem arises because of the fact that the bonding takes place in a non-oxidizing environment. The use of a non-oxidizing or protective environment prevents the metal member from oxidizing as well as any oxygen from interferring with the bonding chemistry. Because of the protective environment, oxygen from the zirconia is driven off at high temperatures (above 450° C) into the environment during the bonding operation. If, subsequently cooled, the oxygen deficient zirconia could not be utilized as a effective electrolyte. When the zirconia is replenished with oxygen another problem arises. Zirconia has a unique characteristic in that as oxygen is reintroduced into oxygen deficient zirconia it undergoes a volumetric expansion which may exceed 20 percent at very high temperatures (around 1,500° C). This expansion phenomena will lead to structural failure of the zirconia and/or the bond between the zirconia and the other member if it proceeds too rapidly or below a temperature where the other member may relieve the increasing stresses due to this volumetric change.

SUMMARY OF THE INVENTION

Thus, it is a principal object of this invention to provide for a method of bonding together two members, at least one of which comprises zirconia.

More particularly, it is an object of this invention to provide for the method of bonding together zirconia with a metal whereby the resulting zirconia is in a fully oxidized state.

According to the broad aspects of this invention after zirconia and the other member are bonded together at a high temperature in a non-oxidizing environment, the members are held at an annealing temperature of the zirconia. Oxygen is then introduced into the environment of the members at that annealing temperature and maintained at that temperature for a period of time from about 30 minutes or more depending on the temperature used. Any oxygen deficiency in the zirconia resulting from the bonding procedure is replenished without detrimental effects on the two members.

Initially, the zirconia is preferably bonded to the other member by first preparing a mixture comprising a metallic component selected from the group consisting of titanium, zirconium, titanium hydride, and zirconium hydride, and a brazing metallic component. The mixture is applied to the region of the zirconia member to be bonded and the members are placed with the regions to be bonded in contiguous relationships. The members are then placed into a non-oxidizing environment and heated to above the melting temperature of the mixture. Preferably, the mixture of the active metallic component and the braze is a eutectic mixture of a relatively low melting point.

THE PREFERRED EMBODIMENT

In a preferred embodiment of our invention a eutectic mixture comprising titanium hydride and a powdered brazing metal, such as copper, is applied to the region of a zirconia member to be bonded with a metal alloy member such as nickel plated zircaloy, which is a zirconium alloy. Preferably, the zircaloy is first nickel plated in the region to be bonded. The eutectic mixture chosen preferably has a melting point of about 870° C. The hydride and brazing metal mixture may be held in suspension in alcohol, water, resin, binder, or the like, which is painted or sprayed on the zirconia, although a solid foil may well be prepared from the mixture. After coating the zirconia member with the titanium hydride mixture, the zirconia member and the zircaloy member are held together in close contact. The members are then placed into a pure helium atmosphere and heated to above the melting point of the mixture which for the eutectic titanium hydride-copper is about 870° C. The hydride dissociates and prepares the surface of the zirconia for a chemical reaction with titanium. It is believed that the titanium component of the mixture bonds chemically to the zirconia and the copper component brazes with the nickel coated zircaloy. After about 3 to 5 minutes at this temperature, the members are cooled slowly to the annealing temperature of the zirconia. We have found that the zirconia will anneal properly above about 450° C. Anything over 800° C will cause oxidation of the zircaloy when the oxygen is introduced into the environment; therefore, 650° C is chosen as an optimum temperature for the system. The upper limit temperature will of course depend on the type of material used. The oxygen is slowly diffused into the environment as atmospheric air. The oxygen diffusion may take from 5 minutes or more. After about 8 hours at this annealing temperature the members are allowed to cool to room temperature. The result is a hermetic seal of zirconia and zircaloy with oxygen restored in the zirconia.

While the present invention involves the use of titanium hydride as its preferred embodiment, zirconium, titanium or the hydride of zirconium may also be used alone or in combination with titanium hydride. We have found, however, that in general the two forms of the hydrides form superior bonds with the zirconia. Also instead of an inert environment, it is possible to bond the members initially in a reducing environment such as in a pure dry hydrogen atmosphere (except with zircaloy which is embrittled by hydrogen).

EXAMPLES

Example 1

A stabilized zirconia disc was painted with a titanium hydride-copper brazing mixture suspended in water in a eutectic mixture ratio of about 28 percent titanium hydride and about 72 percent copper by weight. The zirconia disc was comprised of zirconium dioxide stabilized with 15 mole percent calcia. A nickel plated zircaloy member was placed in contact with the painted surface of the zirconia. The zircaloy member was comprised of a tubular member, whose surface was carefully prepared and then electroless nickel plated. The two members were placed in a sealed oven and helium was allowed to flow through the oven. The temperature was raised in the oven to about 900° C (900° C is above the melting temperature of the mixture 870° C) for about 3 minutes after which it was dropped to about 650° C, an annealing temperature of the zirconia below which the zircaloy member would not oxidize readily upon introduction of air. At this temperature, atmospheric air was allowed to slowly diffuse into the oven by stopping the helium flow and opening a port to the air in order to reoxidize the zirconia. The members were held in equilibration with room air for 5 hours. The result was a completely hermetic seal of the zircaloy and zirconia with complete reoxidation of the zirconia, and no detrimental effects on the bond or the zirconia upon subsequent reheating in air.

Example 2

The same procedure of Example 1 was followed except titanium was used in the eutectic mixture instead of its hydride.

Example 3

The same procedure of Example 1 was followed with the exception that a eutectic mixture of 47 percent zirconium hydride and 53 percent copper by weight and having a melting point of 890° C was applied to the zirconia disc. Again good bonding and structural results were obtained.

Example 4

The same procedure of Example 3 was followed except zirconium was used in the eutectic mixture instead of its hydride.

We claim as our invention:

1. Method of bonding together two members, at least one of which comprises zirconia, which comprises:
   a. preparing a mixture consisting essentially of a metallic component selected from the group consisting of titanium, zirconium, titanium hydride, and zirconium hydride, and a brazing metallic component;
   b. applying the mixture to the region of the zirconia member to be bonded;
   c. placing the members with the regions to be bonded in contiguous relationship;
   d. heating the members to above the melting point of said mixture in a non-oxidizing environment;
   e. cooling the members to an annealing temperature of said zirconia; and,
   f. introducing oxygen into the environment of said members at said annealing temperature, whereby any oxygen deficiency in the zirconia is replenished without detrimental effects on the two members.

2. The method of claim 1 wherein said mixture is an eutectic mixture.

3. The method of claim 1 wherein said metallic component is zirconium.

4. The method of claim 1 wherein said metallic component is titanium.

5. The method of claim 1 wherein said metallic component is zirconium hydride.

6. The method of claim 1 wherein said metallic component is titanium hydride.

7. The method of claim 1 wherein said members are maintained at the annealing temperature over about 4 hours.

8. The method of claim 1 wherein said brazing compound comprises copper.

9. The method of claim 1 wherein said brazing compound comprises silver.

10. In a method of bonding two members, at least one being zirconia, wherein said members are heated to above about 450° C in a non-oxidizing environment during the bonding procedure, the steps following the initial heating and bonding of said members comprising:
    a. holding said members at an annealing temperature of said zirconia; and,
    b. introducing oxygen into the environment thereof at said annealing temperature, whereby any oxygen deficiency in the zirconia is replenished without detrimental effects on the two members.

11. The method of claim 10 wherein oxygen is introduced into the environment as atmospheric air.

12. The method of claim 10 wherein the other member is stainless steel.

13. The method of claim 10 wherein the other member is zircaloy.

* * * * *